(12) United States Patent
Motoyama et al.

(10) Patent No.: US 8,329,305 B2
(45) Date of Patent: Dec. 11, 2012

(54) COATING FILM HAVING LOW REFRACTIVE INDEX AND WATER REPELLENCY

(75) Inventors: Kenichi Motoyama, Funabashi (JP); Yoshihiro Tani, Funabashi (JP)

(73) Assignee: Nissan Chemical Industries, Ltd., Tokyo (JP)

(*) Notice: Subject to any disclaimer, the term of this patent is extended or adjusted under 35 U.S.C. 154(b) by 0 days.

(21) Appl. No.: 13/071,051

(22) Filed: Mar. 24, 2011

(65) Prior Publication Data

US 2011/0172355 A1   Jul. 14, 2011

Related U.S. Application Data

(63) Continuation of application No. 10/583,557, filed as application No. PCT/JP2004/018921 on Dec. 17, 2004, now abandoned.

(30) Foreign Application Priority Data

Dec. 18, 2003   (JP) .................... 2003-421057

(51) Int. Cl.
*B32B 9/04* (2006.01)
*C03C 17/02* (2006.01)

(52) U.S. Cl. ........ 428/447; 427/168; 427/169; 427/387; 526/26; 526/26.5; 526/42

(58) Field of Classification Search ............ 524/492
See application file for complete search history.

(56) References Cited

U.S. PATENT DOCUMENTS

| | | | |
|---|---|---|---|
| 4,879,345 A | 11/1989 | Connelly et al. | |
| 5,800,926 A | 9/1998 | Nogami et al. | |
| 5,902,226 A * | 5/1999 | Tasaki et al. | 516/34 |
| 6,472,012 B2 | 10/2002 | Nakada et al. | |
| 6,855,375 B2 | 2/2005 | Nakagawa et al. | |
| 7,211,522 B2 | 5/2007 | Motoyama et al. | |
| 7,491,651 B2 | 2/2009 | Motoyama et al. | |
| 7,550,040 B2 | 6/2009 | Tani et al. | |
| 7,758,687 B2 | 7/2010 | Tani et al. | |
| 2001/0012565 A1 | 8/2001 | Nakada et al. | |
| 2001/0050741 A1 | 12/2001 | Hokazono et al. | |
| 2004/0115955 A1 | 6/2004 | Motoyama et al. | |
| 2004/0125169 A1 | 7/2004 | Nakagawa et al. | |
| 2004/0156110 A1 | 8/2004 | Ikeyama | |
| 2004/0241421 A1 * | 12/2004 | Ootsuka et al. | 428/323 |
| 2004/0247875 A1 * | 12/2004 | Ootsuka et al. | 428/411.1 |
| 2006/0189163 A1 * | 8/2006 | Motoyama et al. | 438/781 |
| 2006/0287460 A1 * | 12/2006 | Tani et al. | 528/28 |
| 2007/0155897 A1 | 7/2007 | Tani et al. | |

FOREIGN PATENT DOCUMENTS

| | | |
|---|---|---|
| JP | 61-010043 | 1/1986 |
| JP | 05-105424 | 4/1993 |
| JP | 06-157076 | 6/1994 |
| JP | 8-100124 | 4/1996 |
| JP | 9-208898 | 8/1997 |
| JP | 2001-115087 | 4/2001 |
| JP | 2001-194505 | 7/2001 |
| JP | 2003-138211 | 5/2003 |

OTHER PUBLICATIONS

Office Action issued on Feb. 1, 2011, in Japanese Application No. 2005-516364 (with English translation).

* cited by examiner

*Primary Examiner* — Robert S Loewe

(74) *Attorney, Agent, or Firm* — Oblon, Spivak, McClelland, Maier & Neustadt, L.L.P.

(57) ABSTRACT

To provide a highly hard coating film formed on a substrate, as adhered to the surface of the substrate and having a refractive index of from 1.28 to 1.41 and a contact angle with water of from 90° to 115°. A coating film having a refractive index of from 1.28 to 1.41 and a contact angle with water of from 90° to 115°, which is formed as adhered to a substrate surface by forming a reaction mixture comprising a silicon compound (A) of the formula $Si(OR)_4$, a silicon compound (B) of the formula $CF_3(CF_2)_nCH_2CH_2Si(OR^1)_3$, a silicon compound (C) of the formula $H_2NCOH(CH)_mSi(OR^2)_3$, an alcohol (D) of the formula $R^3CH_2OH$ and oxalic acid (E), in a specific ratio, heating this reaction mixture at a temperature of from 40 to 180° C. in the absence of water to form a solution of a polysiloxane, then applying a coating fluid comprising the polysiloxane solution on a substrate surface to form a coating, and heat-curing the coating at a temperature of from 40 to 450° C.; a process for forming such a coating film, and a process for producing such a coating fluid.

8 Claims, No Drawings

COATING FILM HAVING LOW REFRACTIVE INDEX AND WATER REPELLENCY

CROSS-REFERENCE TO RELATED APPLICATIONS

This application is a Continuation of Ser. No. 10/583,557 filed on Jun. 19, 2006, now abandoned, which is a National Stage of PCT/JP04/18921 filed on Dec. 17, 2004. This application is based upon and claims the benefit of priority from Japanese Patent Application No. 2003-421057 filed Dec. 18, 2003.

TECHNICAL FIELD

The present invention relates to an improvement of a coating film formed on a substrate from a polymer solution of alkoxy group-containing silicon compounds. Particularly, the present invention relates to a highly hard coating film having a low refractive index and a large contact angle with water, which is formed as adhered to a substrate surface by heat-curing on the substrate surface a coating comprising a solution of a polysiloxane prepared by co-polycondensing alkoxy group-containing silicon compounds having a specific composition, without adding water.

BACKGROUND ART

It is known that when a coating film showing a refractive index lower than the refractive index of a substrate is formed on the surface of the substrate, the reflectance of light reflected from the surface of the coating film decreases. Such a coating film showing a decreased light reflectance is utilized as an antireflection film and practically applied to various substrate surfaces.

A process for forming an antireflection film having a low refractive index, on a substrate, is disclosed which comprises applying on a glass substrate such as a cathode ray tube an alcohol dispersion of fine particles of $MgF_2$ formed by reacting a magnesium salt or an alkoxy magnesium compound as a Mg source with a fluoride salt as a F source, or a liquid having tetraalkoxysilane or the like added thereto for improving the film strength, as a coating fluid, followed by heat-treatment at a temperature of from 100° C. to 500° C. (Patent Document 1).

A low reflection glass having formed on a glass substrate a thin film showing a refractive index of from 1.21 to 1.40 and having a thickness of from 60 to 160 nm with irregularities or micro-pits having a diameter of from 50 to 200 nm, is disclosed, wherein the film is formed by mixing a solvent such as an alcohol with at least two hydrolytic polycondensates different in the average molecular weight, such as tetraalkoxysilane, methyltrialkoxysilane, to obtain a coating fluid, forming a coating film from such a coating fluid by controlling the relative humidity and the mixing ratio at the time of the above mixing, and heating the coating film (Patent Document 2).

A low reflectance glass comprising a glass, a lower layer film having a high refractive index formed on its surface and an upper layer film having a low refractive index formed on the surface thereof, is disclosed (Patent Document 3). As a detailed description of the process for forming the upper layer film, this publication discloses a process which comprises hydrolyzing a fluorine-containing silicone compound having a polyfluorocarbon chain such as $CF_3(CF_2)_2C_2H_4Si(OCH_3)_3$ and a silane coupling agent such as $Si(OCH_3)_4$ in an amount of from 5 to 90 wt % based thereon, in an alcohol solvent in the presence of a catalyst such as acetic acid, followed by filtration to obtain a liquid of a co-polycondensate, then applying this liquid on the lower layer film and heating it at a temperature of from 120 to 250° C.

A coating film having a refractive index of from 1.28 to 1.38 and a contact angle with water of from 90° to 115°, is disclosed which is formed as adhered on a substrate surface, by preparing a reaction mixture comprising a silicon compound of the formula $Si(OR)_4$, a silicon compound of the formula $CF_3(CF_2)_nCH_2CH_2Si(OR^1)_3$, an alcohol of the formula $R^2CH_2OH$ and oxalic acid in a specific ratio, heating this reaction mixture at a temperature of from 40 to 180° C. in the absence of water to form a solution of a polysiloxane, applying a coating fluid containing the solution on a substrate surface to form a coating, and heat-curing the coating at a temperature of from 80 to 450° C. (Patent Document 4).

Patent Document 1: JP-A-05-105424
Patent Document 2: JP-A-06-157076
Patent Document 3: JP-A-61-010043
Patent Document 4: JP-A-09-208898

DISCLOSURE OF THE INVENTION

Problems to be Solved by the Invention

The process for forming a multilayer coating film on a substrate as disclosed in the above Patent Document 3, requires repetition of the coating and baking steps, and is not efficient. Besides, due to repetition of the baking step, cracks are likely to form in the coating film, the resulting coating film tends to be non-uniform, and deformation of the substrate is likely to occur. Further, in order to impart a low refractive index to the upper layer film formed from the coating fluid obtained by such as hydrolytic method, it is required to use a large amount of the fluorine-containing silicone compound at a level of at least 1.1 mol per mol of the silane coupling agent, and even in such a case, a coating film having a refractive index lower than 1.33 is hardly obtainable. Further, if the coating fluid obtained by such a hydrolytic method, is directly applied on the substrate, and the coating is heated, the resulting coating film, will not have sufficient hardness.

By the process disclosed in the above Patent Document 1, the bond strength among the fine particles of $MgF_2$ is weak, so that the formed coating film is poor in the mechanical strength, and the adhesive strength to the substrate is inadequate. Besides, this coating film made of $MgF_2$ does not essentially show a refractive index lower than 1.38, and depending upon the type of the substrate, no adequate antireflection property can be obtained. The process disclosed in the above Patent Document 2 is cumbersome in the preparation and incorporation of the polycondensates having different molecular weights and further requires control of the relative humidity during the film-forming and the surface irregularities of the coating film. Thus, this process is not practically useful.

Each of the coating films disclosed in the above Patent Documents 1 and 2 is susceptible to staining of its surface during practical use, and to prevent such staining, it has been common to apply a treating agent having higher water repellency on its surface, such as a stain-proofing agent made of a fluorine-containing compound.

The coating film disclosed in the Patent Document 4 forms a highly hard and highly water repellent low reflection coating film when applied to a plastic film having irregularities formed on its surface, like an antiglare-treated hard coat-covered triacetylcellulose (TAC) film. However, the hardness tends to be inadequate when it is formed on a film having a smooth surface such as a clear hard coat-covered TAC film.

It is an object of the present invention to provide a process for simply and efficiently forming an improved highly hard coating film on a substrate, particularly to provide a highly hard coating film formed on a substrate, as adhered to the surface of the substrate and having a refractive index of from 1.28 to 1.41 and a contact angle with water of from 90° to 115°.

Means to Solve the Problems

The coating film of the present invention is a coating film having a refractive index of from 1.28 to 1.41 and a contact angle with water of from 90° to 115°, which is formed as adhered to a substrate surface by forming a reaction mixture comprising a silicon compound (A) of the formula (1):

$$Si(OR)_4 \quad (1)$$

wherein R is a $C_{1-5}$ alkyl group, a silicon compound (B) of the formula (2):

$$CF_3(CF_2)_nCH_2CH_2Si(OR^1)_3 \quad (2)$$

wherein $R^1$ is a $C_{1-5}$ alkyl group, and n is an integer of from 0 to 12, a silicon compound (C) of the formula (3):

$$H_2NCONH(CH)_mSi(OR^2)_3 \quad (3)$$

wherein $R^2$ is a $C_{1-5}$ alkyl group, and m is an integer of from 1 to 5, an alcohol (D) of the formula (4):

$$R^3CH_2OH \quad (4)$$

wherein $R^3$ is a hydrogen atom or a $C_{1-12}$ alkyl group (the alkyl group may optionally be substituted by one or more substituents of the same or different types selected from the group consisting of a $C_{1-3}$ alkyl group, a $C_{1-3}$ hydroxyalkyl group, a $C_{2-6}$ alkoxyalkyl group, a $C_{2-6}$ hydroxyalkoxyalkyl group and a $C_{3-6}$ alkoxyalkoxyalkyl group), and oxalic acid (E), in a ratio of from 0.05 to 0.43 mol of the silicon compound (B) per mol of the silicon compound (A), in a ratio of from 0.01 to 0.20 mol of the silicon compound (C) per mol of the silicon compound (A), in a ratio of from 0.5 to 100 mol of the alcohol (D) per mol of the total alkoxy groups contained in the silicon compounds (A), (B) and (C) and in a ratio of 0.2 to 2 mol of the oxalic acid (E) per mol of the total alkoxy groups contained in the silicon compounds (A), (B) and (C); heating this reaction mixture at a temperature of from 40 to 180° C. until the total amount of the silicon compounds (A), (B) and (C) remaining in the reaction mixture becomes at most 5 mol %, while it is maintained at a $SiO_2$ concentration of from 0.5 to 10 wt % as calculated from silicon atoms in the reaction mixture and while absence of water is maintained, to form a solution of a polysiloxane thereby formed; then applying a coating fluid comprising the polysiloxane solution on a substrate surface to form a coating; and heat-curing the coating at a temperature of from 40 to 450° C.

The above mentioned polysiloxane solution is transparent and contains no gelled polysiloxane. This polysiloxane is not one formed by condensation of hydrolysates of the silicon compounds (A), (B) and (C), since the silicon compounds (A), (B) and (C) are heated in a reaction mixture wherein no water is present, although a large amount of the alcohol (D) and a relatively large amount of oxalic acid (E) are present. When a polysiloxane is formed from an alkoxysilane by hydrolysis in an alcohol solvent, it is likely that the liquid will be turbid as the hydrolysis proceeds, or a non-uniform polysiloxane will form. However, with the above reaction mixture by the present invention, no such a phenomenon will take place.

With respect to the above polysiloxane by the present invention, its chemical structure is complex and can hardly be specified. However, it is considered that the polymerization proceeds as the alcohol (D) will act on an intermediate formed by a reaction of the silicon compounds (A), (B) and (C) with the oxalic acid (E), whereby a co-polycondensate polysiloxane of the silicon compounds (A), (B) and (C) will be formed which has a polymerization degree of a level to form a solution and which has a relatively uniform structure, although it may have a branched structure.

By heating a coating containing the above polysiloxane solution applied on the substrate, removal of a volatile component from the coating and a curing reaction of the polysiloxane in the coating will proceed thereby to form an insoluble coating film as adhered to the substrate surface and having a low refractive index and water repellency.

Here, instead of heat-curing the coating obtained by the application, at a temperature of from 40 to 450° C., the obtained coating may be dried at a temperature of from 40 to 150° C. and then aged at a temperature of from 20 to 100° C. for curing thereby to obtain a coating film.

As the molar ratio of the amount of the silicon compound (B) to the amount of the silicon compound (A) becomes large, the refractive index of this coating film becomes low, and the contact angle with water becomes large. However, as is different from the upper layer film disclosed in the above Patent Document 3, the coating film of the present invention has a refractive index lower than the refractive index of such an upper layer film, in spite of the fact that it is formed from a coating fluid having a low content of the silicon compound (B).

Effects of the Invention

The polysiloxane solution to be used for forming the coating film of the present invention has stability durable for storage for about six months at room temperature and thus may be presented as an industrial product. And, the coating film of the present invention can easily be obtained by a step of applying on a substrate surface a coating fluid comprising such a solution as the industrial product and a step of heat-curing the coating.

By forming the coating film of the present invention on a substrate having a refractive index higher than the refractive index of the coating film of the present invention, such as on a hard coating-covered TAC film or on a usual glass surface, it is easily possible to convert such a substrate to an antireflective substrate. The thickness of the coating film of the present invention may be adjusted by the thickness of the coating, but it can easily be adjusted by adjusting the $SiO_2$ concentration in the coating fluid. The coating film of the present invention may be used effectively as a single coating film on the substrate surface, but it may also be used as an upper layer coating film on a lower layer coating film having a high refractive index.

It is known that a relational expression of $d=(2b-1)\lambda/4a$ (wherein b is an integer of at least 1) is satisfied between the thickness d (nm) of the coating film having a refractive index a and the wavelength $\lambda$ (nm) of light, of which a decrease in reflectance by this coating film is desired. Accordingly, by setting the thickness of the coating film by utilizing this expression, it is readily possible to prevent reflection of any desired light. For example, it is easily possible to accomplish prevention of reflection from a glass surface of light having a center wavelength 550 nm of visible light by a coating film having a refractive index of 1.32, by adopting a coating film thickness of 104 nm obtained by substituting such numerical values for λ and a in the above formula and substituting 1 for b, or a coating film thickness of 312 nm obtained by substituting 2 for b. The coating film of the present invention can be applied to the surface of a cathode ray tube made of glass, a display of a computer, a mirror having a glass surface, a showcase made of glass or various other products, which are desired to have reflection of light prevented. The coating film of the present invention is highly hard and excellent in scratch resistance and has a practically sufficient antifouling property, and it can be formed by baking at a low temperature at a level of about 100° C. Accordingly, it is useful particularly for an antireflection film for a liquid crystal TV or a display monitor.

BEST MODE FOR CARRYING OUT THE INVENTION

Examples of the alkyl group R in the above formula (1) include methyl, ethyl, propyl, butyl and pentyl. Preferred examples of the silicon compound (A) include tetramethoxysilane, tetraethoxysilane, tetrapropoxysilane and tetrabutoxysilane. Among them, particularly preferred are tetramethoxysilane and tetraethoxysilane.

Examples of the alkyl group $R^1$ in the above formula (2) include methyl, ethyl, propyl, butyl and pentyl. Preferred examples of the silicon compound (B) include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane and heptadecafluorodecyltriethoxysilane. These compounds may be used alone or in combination as a mixture of two or more of them.

The above formula (3) represents an alkyltrialkoxysilane containing an alkyl group having a ureido group ($H_2NCONH$—) at its terminal. Examples of the alkyl group $R^2$ contained in the alkyl in the above formula (3) include methyl, ethyl, propyl or butyl. Preferred examples of the silicon compound (C) include γ-ureidopropyltrimethoxysilane, γ-ureidopropyltriethoxysilane and γ-ureidopropyltripropoxysilane. Among them, γ-ureidopropyltrimethoxysilane and γ-ureidopropyltriethoxysilane are, for example, particularly preferred.

Examples of the unsubstituted alkyl group $R^3$ in the above formula (4) include methyl, ethyl, propyl, butyl, pentyl, hexyl, heptyl and octyl. Examples of the substituted alkyl group $R^3$ include hydroxymethyl, methoxymethyl, ethoxymethyl, hydroxyethyl, methoxyethyl, ethoxyethyl, methoxyethoxymethyl and ethoxyethoxymethyl. Preferred examples of the alcohol (D) include methanol, ethanol, propanol, n-butanol, ethylene glycol monomethyl ether, ethylene glycol monoethyl ether, diethylene glycol monomethyl ether and diethylene glycol monoethyl ether. These alcohols may be used alone or in combination as a mixture of two or more of them. Among them, particularly preferred are methanol and ethanol.

A uniform polysiloxane solution is hardly obtainable from a reaction mixture in which the silicon compound (B) is used in an amount exceeding 0.43 mol per mol of the silicon compound (A). From a reaction mixture wherein the silicon compound (B) is used in an amount of less than 0.04 mol per mol of the silicon compound (A), a coating film having a refractive index of 1.41 or less will hardly be formed, and the coating film thereby formed will not exhibit water repellency showing a contact angle with water of at least 90°. It is particularly preferred that the silicon compound (B) is used in an amount of from 0.05 to 0.25 mol per mol of the silicon compound (A).

From a reaction mixture wherein the silicon compound (C) is used in an amount of more than 0.20 mol per mol of the silicon compound (A), a coating film having a refractive index of 1.41 or less will hardly be obtainable. And, from a reaction mixture wherein the silicon compound (C) is used less than 0.01 mol per mol of the silicon compound (A), a film showing adequate hardness will hardly be obtainable. It is particularly preferred that the silicon compound (C) is used in an amount of from 0.01 to 0.20 mol per mol of the compound (A).

If the alcohol (D) is used in an amount less than 0.5 mol per mol of the total alkoxy groups contained in the silicon compounds (A), (B) and (C), it takes a long time to form the polysiloxane, and it tends to be difficult to form a coating film having high hardness from the liquid containing the polysiloxane thereby obtained. On the other hand, if the alcohol is used in an amount more than 100 mol per mol of the total alkoxy groups contained in the silicon compounds (A), (B) and (C), the $SiO_2$ concentration in the obtained polysiloxane-containing liquid tends to be inadequate, and concentration will be required prior to coating, such being inefficient. It is particularly preferred to use the alcohol in an amount of from 1 to 50 mol per mol of the total alkoxy groups contained in the silicon compounds (A), (B) and (C).

If oxalic acid (E) is used in an amount less than 0.2 mol per mol of the total alkoxy groups contained in the silicon compounds (A), (B) and (C), it tends to be difficult to form a coating film having high hardness from the resulting polysiloxane-containing liquid. On the other hand, if the oxalic acid (E) is used in an amount more than 2 mol per mol of the total alkoxy groups contained in the silicon compounds (A), (B) and (C), the resulting polysiloxane-containing liquid contains a relatively large amount of the oxalic acid (E), and from such a liquid, it tends to be difficult to obtain a coating film having the desired properties. It is particularly preferred to use the oxalic acid (E) in an amount of from 0.25 to 1 mol per mol of the total alkoxy groups contained in the silicon compounds (A), (B) and (C).

In the formation of the reaction mixture, an alkylalkoxysilane may be incorporated as a modifier (F), for example, in an amount of from 0.02 to 0.2 mol per mol of the silicon compound (A), as the case requires, in addition to the silicon compounds (A), (B) and (C), the alcohol (D) and the oxalic acid (E). Preferred examples of the modifier (F) include trialkoxysilanes such as methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane and γ-methacryloxypropyltriethoxysilane, and dialkoxysilanes such as dimethyldimethoxysilane, dimethyldiethoxysilane, γ-ureidopropylmethyldimethoxysilane and γ-ureidopropylmethyldiethoxysilane. These modifiers may be used alone or in combination as a mixture of two or more of them.

Such a modifier (F) is capable of lowering the temperature for curing the coating on the substrate and improves the adhesion of the coating film to the substrate. The reaction mixture comprising the silicon compounds (A), (B) and (C), the alcohol (D) and the oxalic acid (E) may be formed by mixing such components, or by further incorporating the above modifier (F) thereto. To such a reaction mixture, no water may be added. This reaction mixture is preferably heated in the form of a solution. For example, it is preferably heated as a reaction mixture in the form of a solution obtained by preliminarily adding the oxalic acid (E) to the alcohol (D) to form an alcohol solution of oxalic acid and then mixing the silicon compounds (A), (B) and (C) and the above modifier (F), or as a reaction mixture in the form of a solution obtained by mixing a solution having the oxalic acid (E) preliminarily added and dissolved in the alcohol (D) to a mixture of the silicon compounds (A), (B) and (C) and the above modifier (F). The reaction mixture comprising the silicon compounds (A), (B) and (C), the alcohol (D) and the oxalic acid (E) in the above mentioned ratio, usually has a $SiO_2$ concentration of from 0.5 to 10 wt % when silicon atoms contained therein are calculated as $SiO_2$. Also in the case of the reaction mixture containing the above modifier (F), such a modifier (F) is incorporated so that the mixture will have a $SiO_2$ concentration of from 0.5 to 10 wt % when silicon atoms contained therein are calculated as $SiO_2$. Such a reaction mixture is maintained at the above $SiO_2$ concentration and in the absence of water during the heating of the reaction mixture. This heating can be carried out in a usual reactor at a liquid temperature of from 50 to 180° C. Preferably, it is carried out, for example, in a closed container or under reflux, so that no evaporation or volatilization of the liquid from the reactor occurs.

If the heating to form the polysiloxane is carried out at a temperature lower than 50° C., the liquid tends to have turbidity or tends to contain insoluble substances. Therefore, this heating is carried out at a temperature higher than 50° C. If the temperature is high, the operation can be completed in a short period of time. However, heating at a temperature higher than 180° C. is inefficient, as no additional merits will be thereby obtained. The heating time is not particularly limited. For example, it is usually about 8 hours at 50° C. and about 3 hours under reflux at 78° C. Usually, the heating is terminated when the amount of the remaining silicon compounds (A), (B) and (C) becomes at most 5 mol %, based on the total charge amount of the silicon compounds (A), (B) and (C). If a polysiloxane-containing liquid in which these silicon compounds remain more than 5% based on the total amount of the silicon compounds (A), (B) and (C) charged, is applied on a substrate surface and then the coating is heat-cured at a temperature of from 40 to 450° C., the resulting coating film tends to have pinholes, or it tends to be difficult to obtain a coating film having adequate hardness.

The polysiloxane solution obtained by the above heating, may be used directly as a coating fluid for the next coating step. However, if desired, it may be concentrated or diluted to obtain a solution useful as a coating fluid, or the solvent may be substituted by other solvent to obtain a solution useful as a coating fluid. Otherwise, an optional additive (G) may be added thereto to obtain a coating fluid. Examples of such an additive (G) include a silica sol, an alumina sol, a titania sol, a zirconia sol, a magnesium fluoride sol and a ceria sol, which are in the form of sols of colloidal inorganic fine particles. These sols may be used alone or in combination as a mixture of two or more of them. Such sols are preferably organo sols. Particularly preferred are organo sols using an alcohol or ketone as the dispersing medium. The amount of the sol to be added, may be selected optionally, so long as the amount of colloidal inorganic fine particles is at most 70 wt %, based on the total weight of the heat cured solid content in the coating fluid. As other additives (G), a tetraalkoxysilane oligomer, metal salts or metal compounds may, for example, be mentioned. These additives are suitable for controlling the water repellency of the coating film or for increasing the hardness of the film.

The coating fluid to be used in the coating step, is preferably a fluid which contains from 0.5 to 10 wt %, as calculated as $SiO_2$ of silicon atoms derived from the above polysiloxane transparent solution. If this $SiO_2$ concentration is less than 0.5%, the thickness of the coating film formed by one coating operation tends to be thin. If the concentration exceeds 10 wt %, the storage stability of such a coating fluid tends to be inadequate. It is particularly preferred that the $SiO_2$ concentration of this coating fluid is from 1 to 8 wt %.

The substrate is not particularly limited so long as it permits formation of an adhesive coating film thereon. In order to form an antireflection coating film thereon, it is preferred to use a substrate having a refractive index higher than the refractive index of the coating film, such as usual glass or plastics. Further, a plastic substrate having one or more hard coat layers having a refractive index higher than the refractive index of the coating film formed on the substrate, may also be used. The above polysiloxane solution or a coating fluid comprising such as solution, can be applied on the substrate by a conventional method such as a dipping method, a spin coating method, a brush coating method, a roll coating method or a flexo printing method.

The coating formed on the substrate may directly be heat-cured at a temperature of from 40 to 450° C. However, prior to such heat-curing, it may be dried at a temperature of from room temperature to 80° C., preferably from 50 to 80° C., and then heated at a temperature of from 40 to 450° C., preferably from 70 to 450° C. The time for this heating may be from 5 to 60 minutes for adequate heat-curing. If this heating temperature is lower than 40° C., the hardness, chemical resistance or the like of the resulting coating film tends to be inadequate. In the case of a heat resistant substrate such as glass, heating may usually be carried out at a temperature of at least 300° C. However, at a temperature higher than 450° C., no adequate water repellency tends to be imparted to the resulting coating film. A plastic film such as TAC may be used at a temperature of at most the heat resistant temperature of about 100° C. and will reach to a practical hardness by heat treatment at 100° C. for about 30 minutes, or at 120° C. for about 5 minutes. Such heating can be carried out by a conventional method, for example, by using a hot plate, an oven or a belt furnace.

Further, as a low temperature curing method, the coating after application may be dried at a temperature of from 40 to 150° C. for from 1 to 5 minutes and then aged at a temperature of from 20 to 100° C. for from one hour to seven days in a sheet form or a rolled form, whereby a practically sufficient hardness can be obtained. A practically sufficient hardness can be reached at an aging temperature of 100° C. for one hour, at 40° C. for three days, or at 23° C. for 7 days. This method is useful in a case where the coating is applied by means of a roll coater.

EXAMPLES

Now, the present invention will be described with reference to Examples. However, it should be understood that the present invention is by no means restricted to such Examples.
Gas Chromatography (GC)

In Examples 1, 2, 3 and 4, and Comparative Example 1, the remaining alkoxysilane monomer after the reaction was confirmed by means of gas chromatography.

Conditions for gas chromatography: Apparatus: Shimadzu GC-14B, column: capillary column CBP1-W25-100 (25 mm×0.53 mmφ×1 μm), column temperature: the column temperature was controlled by using a temperature raising program. The temperature was raised from the initial temperature of 50° C. at a rate of 15° C./min to the ultimate temperature of 240° C. (3 minutes).

Injected amount of sample: 1 μm, injection temperature: 200° C., detector temperature: 240° C., carrier gas: nitrogen (flow rate 30 mL/min), detection method: FID method.

Example 1

37.2 g of methanol was charged into a four-necked reaction flask equipped with a reflux condenser, and 18.0 g of oxalic acid was gradually added to this methanol with stirring, to prepare a methanol solution of oxalic acid. Then, this solution was heated to its reflux temperature, and a mixture comprising 18.8 g of tetraethoxysilane, 1.3 g of a methanol solution containing 92% of γ-ureidopropyltriethoxysilane, 2.3 g of tridecafluorooctyltrimethoxysilane and 22.4 g of methanol, was dropwise added to this solution under reflux. After completion of the dropwise addition, heating under reflux was continued for 5 hours, followed by cooling to obtain a polysiloxane solution ($L_1$).

This solution ($L_1$) was analyzed by gas chromatography, whereby no alkoxysilane monomer was detected. This solution ($L_1$) was applied on the surface of a calcium fluoride substrate, and then the coating was heated at 100° C. for 30 minutes to form a coating film adhered to the surface of this calcium fluoride substrate. Then, with respect to this coating film, the spectrum of transmitted light was measured by means of an infrared spectroscope, whereby absorption by a silanol group was observed in the vicinity of 3,200 cm$^{-1}$ and in the vicinity of 980 cm$^{-1}$, absorption by a methylene group was observed in the vicinity of 2,800 cm$^{-1}$, absorption by Si—O—Si was observed in the vicinity of 1,100 cm$^{-1}$, and absorption by C—F was observed in the vicinity of 1,200 cm$^{-1}$.

Example 2

34.4 g of methanol was charged into a four-necked reaction flask equipped with a reflux condenser, and 18.0 g of oxalic acid was gradually added to this methanol with stirring, to prepare a methanol solution of oxalic acid. Then, this solution was heated to its reflux temperature, and a mixture comprising 17.8 g of tetraethoxysilane, 1.3 g of a methanol solution containing 92% of γ-ureidopropyltriethoxysilane, 4.7 g of tridecafluorooctyltrimethoxysilane and 23.8 g of methanol, was dropwise added to this solution under reflux. After completion of the dropwise addition, heating was continued for 5 hours under reflux, followed by cooling to obtain a polysiloxane solution ($L_2$).

This solution ($L_2$) was analyzed by gas chromatography, whereby no alkoxysilane monomer was detected.

Example 3

52.8 g of methanol was charged into a four-necked reaction flask equipped with a reflux condenser, and 12.0 g of oxalic acid was gradually added to this methanol with stirring, to prepare a methanol solution of oxalic acid. Then, this solution was heated to its reflux temperature, and a mixture comprising 10.5 g of tetraethoxysilane, 0.9 g of a methanol solution containing 92% of γ-ureidopropyltriethoxysilane, 6.2 g of tridecafluorooctyltrimethoxysilane and 17.6 g of methanol, was dropwise added to this solution under reflux. After completion of the dropwise addition, heating was continued for 5 hours under reflux, followed by cooling to obtain a polysiloxane solution ($L_3$). This solution ($L_3$) was analyzed by gas chromatography, whereby no alkoxysilane monomer was detected.

Example 4

52.8 g of methanol was charged into a four-necked reaction flask equipped with a reflux condenser, and 12.0 g of oxalic acid was gradually added to this methanol with stirring, to prepare a methanol solution of oxalic acid. Then, this solution was heated to its reflux temperature, and a mixture comprising 9.6 g of tetraethoxysilane, 0.3 g of γ-aminopropyltriethoxysilane, 0.6 g of γ-glycidoxypropyltrimethoxysilane, 0.9 g of a methanol solution containing 92% of γ-ureidopropyltriethoxysilane, 6.2 g of tridecafluorooctyltrimethoxysilane and 17.6 g of methanol, was dropwise added to this solution under reflux. After completion of the dropwise addition, heating was continued for 5 hours under reflux, followed by cooling to obtain a polysiloxane solution ($L_4$). This solution ($L_4$) was analyzed by gas chromatography, whereby no alkoxysilane monomer was detected.

Example 5

To 90 g of the solution ($L_4$) obtained in Example 4, 2.55 g of a methanol-dispersed silica sol containing 15.7 wt % as $SiO_2$ of colloidal silica having a particle size of 8 nm, and 7.45 g of ethanol, were added and thoroughly mixed to obtain a polysiloxane solution ($L_5$).

Comparative Example 1

70.6 g of ethanol was charged into a four-necked reaction flask equipped with a reflux condenser, and 12.0 g of oxalic acid was gradually added to this ethanol with stirring, to prepare an ethanol solution of oxalic acid. Then, this solution was heated to its reflux temperature, and a mixture comprising 9.4 g of tetraethoxysilane, 6.2 g of tridecafluorooctyltrimethoxysilane [$CF_3C_5F_{10}C_2H_4Si(OCH_3)_3$], 1.2 g of γ-glycidoxypropyltrimethoxysilane and 0.6 g of γ-aminopropyltrimethoxysilane, was dropwise added to this solution under reflux. After completion of the dropwise addition, heating was continued for 5 hours under reflux, followed by cooling to obtain a polysiloxane solution ($L_6$). This solution ($L_6$) was analyzed by gas chromatography, whereby no alkoxide monomer was detected.

Comparative Example 2

To 100 g of the solution ($L_6$) obtained in Comparative Example 1, 51.0 g of a methanol-dispersed silica sol containing 15.7 wt % as $SiO_2$ of colloidal silica having a particle size of 8 nm, and 149 g of ethanol, were added and thoroughly mixed to obtain a polysiloxane solution ($L_7$).

Comparative Example 3

Into a four-necked flask equipped with a reflux condenser, 49.7 g of methanol, 18.8 g of tetraethoxysilane, 1.3 g of a methanol solution containing 92% of γ-ureidopropyltriethoxysilane, and 2.3 g of tridecafluorooctyltrimethoxysilane, were charged and mixed to prepare a methanol solution. Then, this solution was heated to its reflux temperature, and a mixture comprising 22.4 g of methanol, 5.4 g of water and 0.1 g of 60% nitric acid as a catalyst, was dropwise added to this solution under reflux. After completion of the dropwise addition, the heating was continued for 5 hours under reflux, followed by cooling to obtain a solution ($L_8$) containing hydrolysates of alkoxysilanes.

Example 6

Each of the above liquids ($L_1$) to ($L_8$) was used as a coating fluid, and coating was formed by means of a bar coater on a hard coat-covered TAC film (80 µm, reflectance: 4.5%) manufactured by Nippon Paper Industries Co., Ltd. surface-treated by the following method, and then dried at room temperature for 30 minutes. It was further heated in a clean oven for one hour at the temperature shown in Table 1 or 2, to form a coating film on the substrate surface. Then, with respect to each coating film thus obtained, measurements of the refractive index, the reflectance and the contact angle with water, and tests for oil-based ink wiping efficiency and finger print wiping efficiency, were carried out by the following methods. For the measurement of the refractive index, the coating film was formed by spin coating on a silicon substrate. The results are shown in Tables 1 and 2.

Example 7

Each of the above liquids ($L_1$) to ($L_8$) was used as a coating fluid, and coating was formed by means of a bar coater on a hard coat-covered TAC film (80 µm, reflectance: 4.5%) manufactured by Nippon Paper Industries Co., Ltd. surface-treated by the following method, and then dried at room temperature for 30 seconds. It was further dried in a clean oven at 100° C. for 3 minutes to form a coating film on the substrate surface. Further, it was aged in an oven at the temperature and time shown in Tables 3 and 4. Then, with respect to each coating film thus obtained, measurements of the refractive index, the reflectance and the contact angle with water, and tests for oil-based ink wiping efficiency and finger print wiping efficiency, were carried out by the following methods. In the measurement of the refractive index, the coating film was formed by spin coating on a silicon substrate. The results are shown in Tables 3 and 4.

Example 8

An antistatic high refractive index coating fluid prepared by the following method, was applied on a hard coat-covered TAC film (80 µm, reflectance: 4.5%) manufactured by Nippon Paper Industries Co., Ltd. surface-treated by the following method, and then, dried at room temperature for 30 seconds. It was further dried in a clean oven at 100° C. for 5 minutes to prepare an antistatic high refractive index film-covered TAC film (film thickness: about 70 nm, reflectance: 7.2%). On this film, the above mentioned coating liquid ($L_1$) was applied by means of a bar coater to form a coating and then dried at room temperature for 30 seconds. It was further dried in a clean oven at 100° C. for 5 minutes to form a coating film on the substrate surface. It was further aged in an oven at 40° C. for 5 days. Then, with respect to the obtained coating film, measurements of the reflectance and the contact angle with water, the oil-based ink and finger print wiping tests and an abrasion resistance test, were carried out by the following methods. The reflectance was 0.2%, and the contact angle with water was 104°. The oil-based ink and finger print wiping efficiency was good, and the abrasion resistance was "A" under a load of 200 g, and "C" under a load of 500 g.

Method for Surface Treatment of TAC Film

A hard coat-covered TAC film manufactured by Nippon Paper Industries Co., Ltd. was immersed in a 5 wt % potassium hydroxide (KOH) aqueous solution heated to 40° C. for 3 minutes for alkali treatment, then washed with water and then immersed in a 0.5 wt % sulfuric acid ($H_2SO_4$) aqueous solution at room temperature for 30 minute for neutralization, followed by washing with water and drying.

Method for Preparing Antistatic High Refractive Index Coating Fluid

In accordance with the preparation method disclosed in claim 3 in JP-A-6-291743, a mixture of a hydrolysate solution of an ethyl silicate and zinc antimonate particles, was prepared.

The hydrolysate of ethyl silicate was prepared by dropwise adding a mixed liquid comprising 10.0 g of ethanol having 0.1 g of oxalic anhydride dissolved and 9.0 g of distilled water into a mixed solution comprising 20.1 g of ethanol and 20.8 g of tetraethoxysilane (TEOS) at room temperature for 30 minutes, followed by stirring for 30 minutes and then stirring under reflux for one hour.

The above hydrolysate of ethyl silicate was diluted with 540 g of ethanol, and 400 g of a zinc antimonate sol diluted with methanol to 6% of $ZnO.Sb_2O_5$ solid content (CX-Z603M-F2, manufactured by Nissan Chemical Industries, Ltd.) was added, followed by stirring for one hour to obtain an antistatic high refractive index coating fluid.

Method for Measuring Refractive Index

Using Ellipsometer DVA-36L, manufactured by Mizojiri Kogaku K. K., the refractive index of light with a wavelength of 633 nm was measured.

Method for Measuring Reflectance

Using spectrophotometer UV 3100 PC, manufactured by Shimadzu Corporation, the reflectance of light with a wavelength of 550 nm was measured at an angle of incidence of 5°.

Method for Measuring Contact Angle with Water

Using an automatic contact angle meter CA-Z model, manufactured by Kyowa Kaimen Kagaku K.K., the contact angle when 3 µl of pure water was dropped, was measured.

Oil-Based Ink Wiping Test

Using an oil-based ink pen, manufactured by PENTEL CO., LTD., an ink drawn on a substrate surface, was wiped off by means of BEMCOT M-3, manufactured by Asahi Kasei Corporation, whereby the wiping off efficiency was visually evaluated. The evaluation standards are as follows.

A: Ink can completely be wiped off. B: Ink can be wiped off, but a trace will remain. C: Ink can not be wiped off.

Finger Print Wiping Test

A finger print on a substrate surface was wiped off by means of BEMCOT M-3, manufactured by Asahi Kasei Corporation, whereby the wiping off efficiency was visually evaluated.

The evaluation standards are as follows.

A: The finger print can be completely wiped off. B: The finger print can be wiped off, but a trace will remain, or the trace may be removed but the finger print will stretch. C: The finger print can not be wiped off.

Abrasion Resistance

Steel wool #0000, manufactured by Nippon Steel Wool K.K. was reciprocated ten times for abrasion under a load of 200 g/cm² or 500 g/cm², whereupon scratch marks were visually evaluated.

The evaluation standards are as follows.

A: No scratch observed. B: Less than ten scratch marks observed. C: From 10 to 30 scratch marks observed. D: More than 30 scratch marks observed.

Adhesion

A cured coating film on a substrate was cross-cut at 1 mm intervals for 100 sections, and an adhesive tape (trade name: Cellotape, manufactured by NICHIBAN CO., LTD., 24 mm)

was firmly bonded to the cured coating film and then, the adhesive tape was rapidly peeled, whereupon the presence or absence of peeling of the cured film was visually observed.

TABLE 1

| Coating fluid | Temperature for curing (° C.) | Refractive index | Reflectance (%) | Abrasion resistance 200 g | Abrasion resistance 500 g |
|---|---|---|---|---|---|
| $L_1$ | 100 | 1.41 | 2.1 | A | A |
| $L_2$ | 70 | 1.38 | 1.8 | B | D |
| $L_2$ | 100 | 1.38 | 1.8 | A | C |
| $L_2$ | 120 | 1.38 | 1.8 | A | B |
| $L_3$ | 100 | 1.36 | 1.2 | A | C |
| $L_4$ | 100 | 1.36 | 1.2 | A | B |
| $L_5$ | 100 | 1.37 | 1.4 | B | D |
| $L_6$ | 100 | 1.38 | 1.7 | D | D |
| $L_7$ | 100 | 1.39 | 1.9 | C | D |
| $L_8$ | 100 | 1.43 | 2.4 | C | D |

TABLE 2

| Coating fluid | Temperature for curing (° C.) | Contact angle with water (°) | Oil-based ink wiping efficiency | Finger print wiping efficiency | Adhesion |
|---|---|---|---|---|---|
| $L_1$ | 100 | 103 | A | A | 100/100 |
| $L_2$ | 70 | 106 | A | A | 100/100 |
| $L_2$ | 100 | 105 | A | A | 100/100 |
| $L_2$ | 120 | 105 | A | A | 100/100 |
| $L_3$ | 100 | 106 | A | A | 100/100 |
| $L_4$ | 100 | 104 | A | A | 100/100 |
| $L_5$ | 100 | 105 | A | A | 100/100 |
| $L_6$ | 100 | 104 | A | A | 100/100 |
| $L_7$ | 100 | 102 | B | A | 100/100 |
| $L_8$ | 100 | 100 | B | B | 100/100 |

TABLE 3

| Coating fluid | Temperature for aging | Time for aging | Refractive index | Reflectance (%) | Abrasion resistance 200 g | Abrasion resistance 500 g |
|---|---|---|---|---|---|---|
| $L_1$ | 40° C. | Three days | 1.41 | 2.1 | A | A |
| $L_2$ | 23° C. | Seven days | 1.38 | 1.8 | B | C |
| $L_2$ | 40° C. | Three days | 1.38 | 1.8 | A | A |
| $L_2$ | 100° C. | One day | 1.38 | 1.7 | A | A |
| $L_3$ | 40° C. | Three days | 1.36 | 1.2 | A | B |
| $L_4$ | 40° C. | Three days | 1.36 | 1.3 | A | A |
| $L_5$ | 40° C. | Three days | 1.37 | 1.4 | B | C |
| $L_6$ | 40° C. | Three days | 1.38 | 1.7 | D | D |
| $L_6$ | 100° C. | One day | 1.39 | 1.8 | C | D |
| $L_7$ | 40° C. | Three days | 1.40 | 2.0 | D | D |
| $L_7$ | 100° C. | One day | 1.39 | 1.9 | C | D |
| $L_8$ | 40° C. | Three days | 1.44 | 2.6 | D | D |
| $L_8$ | 100° C. | One day | 1.43 | 2.4 | C | D |

TABLE 4

| Coating fluid | Temperature for aging | Time for aging | Contact angle with water (°) | Oil-based ink wiping efficiency | Finger pint wiping efficiency | Adhesion |
|---|---|---|---|---|---|---|
| $L_1$ | 40° C. | Three days | 103 | A | A | 100/100 |
| $L_2$ | 23° C. | Seven days | 106 | A | A | 100/100 |
| $L_2$ | 40° C. | Three days | 105 | A | A | 100/100 |
| $L_2$ | 100° C. | One day | 105 | A | A | 100/100 |
| $L_3$ | 40° C. | Three days | 104 | A | A | 100/100 |
| $L_4$ | 40° C. | Three days | 106 | A | A | 100/100 |
| $L_5$ | 40° C. | Three days | 105 | A | A | 100/100 |
| $L_6$ | 40° C. | Three days | 104 | A | A | 100/100 |
| $L_6$ | 100° C. | One day | 106 | A | A | 100/100 |
| $L_7$ | 40° C. | Three days | 102 | B | A | 100/100 |
| $L_7$ | 100° C. | One day | 103 | B | A | 100/100 |
| $L_8$ | 40° C. | Three days | 101 | B | B | 100/100 |
| $L_8$ | 100° C. | One day | 100 | B | B | 100/100 |

As shown in Table 1, coating films having low refractive indices, low reflectance and good abrasion resistance, were obtained from the coating fluids of the present invention ($L_1$ to $L_5$). Whereas, with the coatings obtained from the coating fluids $L_6$ and $L_7$ of Comparative Examples, the abrasion resistance was not sufficient, although they had low refractive indices and low reflectance. Further, the coating obtained from the coating fluid $L_8$ of Comparative Example did not provide a film having a low refractive index and low reflectance.

Further, as shown in Table 2, the coatings obtained from the coating fluids ($L_1$ to $L_6$) provided water repellent films excellent in adhesion, and the oil-based ink and finger print wiping efficiencies were good. The coating obtained from the coating fluid $L_7$ provided a water repellent film excellent in adhesion, and its finger print wiping efficiency was good, but as a result of the oil-based ink wiping test, black ink was wiped off, but a trace remained.

As shown in Table 3, from the coatings obtained from the coating fluids of the present invention ($L_1$ to $L_5$), coating films having low refractive indices, low reflectance and good abrasion resistance were obtained at an aging temperature of from room temperature to 100° C. Whereas, the coatings obtained from the coating fluids $L_6$ and $L_7$ in Comparative Examples had low refractive indices and low reflectance, but the abrasion resistance was inadequate irrespective of the aging temperature.

Further, as shown in FIG. 4, the coatings obtained from the coating fluids ($L_1$ to $L_6$) provided water repellent films excellent in adhesion, and the oil-based ink and finger print wiping efficiencies were good. The coating obtained from the coating fluid $L_7$ provided a water repellent film excellent in adhesion, and the finger print wiping efficiency was good, but as a result of the oil-based ink wiping test, the black ink was wiped off, but a trace remained.

The polysiloxane solution to be used for forming the coating film of the present invention usually has a stability durable for storage for about 6 months at room temperature, and it can be provided as an industrial product. And, the coating film of the present invention can easily be obtained by a process of applying a coating fluid comprising such a solution of the industrial product on a substrate surface and a step of heat-curing such a coating.

INDUSTRIAL APPLICABILITY

The coating film of the present invention may be applied to the surface of various products for which antireflection of light is desired, including cathode ray tubes made of glass, displays for computers, mirrors having glass surface and showcases made of glass. Further, the coating film of the present invention is highly hard and excellent in abrasion resistance and has a practically sufficient antifouling property, and it is possible to form such a coating film by baking at a low temperature at a level of about 100° C. Thus, it is useful particularly for an antireflection film for liquid crystal TV of display monitors.

The invention claimed is:

1. A process for forming a coating film, the process comprising:
   (1) forming a reaction mixture comprising:
      (A) a silicon compound (A) of formula (1):

$$Si(OR)_4 \quad (1),$$

wherein R is a $C_{1-5}$ alkyl group;
      (B) a silicon compound (B) of formula (2):

$$CF_3(CF_2)_nCH_2CH_2Si(OR^1)_3 \quad (2),$$

wherein $R^1$ is a $C_{1-5}$ alkyl group, and n is an integer of from 0 to 12;
      (C) a silicon compound (C) of formula (3):

$$H_2NCONH(CH_2)_mSi(OR^2)_3 \quad (3),$$

wherein $R^2$ is a $C_{1-5}$ alkyl group, and m is an integer of from 1 to 5;
      (D) an alcohol (D) of formula (4):

$$R^3CH_2OH \quad (4),$$

wherein $R^3$ is a hydrogen atom or a $C_{1-12}$ alkyl group, such that the alkyl group is optionally substituted with one or more substituents of the same or different types selected from the group consisting of a $C_{1-3}$ alkyl group, a $C_{1-3}$ hydroxyalkyl group, a $C_{2-6}$ alkoxyalkyl group, a $C_{2-6}$ hydroxyalkoxyalkyl group and a $C_{3-6}$ alkoxyalkoxyalkyl group; and
      (E) oxalic acid (E),
      wherein
      (i) a ratio of the silicon compound (B) per mol of the silicon compound (A) ranges from 0.05 to 0.43 mol,
      (ii) a ratio of the silicon compound (C) per mol of the silicon compound (A) ranges from 0.01 to 0.20 mol,
      (iii) a ratio of the alcohol (D) per mol of the total alkoxy groups contained in the silicon compounds (A), (B) and (C) ranges from 0.5 to 100 mol, and
      (iv) a ratio of the oxalic acid (E) per mol of the total alkoxy groups contained in the silicon compounds (A), (B) and (C) ranges from 0.2 to 2 mol; and
   (2) heating the reaction mixture at a temperature ranging from 40 to 180° C. until the total amount of the silicon compounds (A), (B) and (C) remaining in the reaction mixture reaches at most 5 mol %, while maintaining a $SiO_2$ concentration ranging from 0.5 to 10 wt % as calculated from silicon atoms in the reaction mixture and in the absence of water, to form a polysiloxane;
   (3) forming a solution of the polysiloxane;
   (4) applying a coating fluid comprising the polysiloxane solution to a substrate surface to form a coating;
   (5) drying the coating at a temperature ranging from 40 to 100° C.; and
   (6) aging the coating at a temperature of from 40 to 100° C. for curing, to form a coating film having a refractive index of from 1.28 to 1.41 and a contact angle with water ranging from 90° to 115°, as adhered to the substrate surface.

2. The process of claim 1, further comprising, in the the reaction mixture:
   (F) at least one modifier (F) selected from the group consisting of methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyl-trimethoxysilane, octadecyltriethoxysilane, phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane, γ-methacryloxypropyltriethoxysilane, dimethyl-dimethoxysilane and dimethyldiethoxysilane, in a ratio of from 0.02 to 0.2 mol per mol of the silicon compound (A).

3. A coating film, formed as adhered to a substrate surface by the process of claim 2.

4. The process of claim 1, wherein the coating fluid further comprises:
   (G) at least one additive (G) selected from the group consisting of a silica sol, an alumina sol, a titania sol, a zirconia sol, a magnesium fluoride sol and a ceria sol.

5. A coating film, formed as adhered to a substrate surface by the process of claim 4.

6. A coating film, formed as adhered to a substrate surface by the process of claim 1.

7. The coating film of claim 6, wherein:
   the drying (5) occurs at a temperature ranging from 40 to 75° C.; and
   the aging (6) occurs at a temperature ranging from 40 to 75° C.

8. The process of claim 1, wherein:
   the drying (5) occurs at a temperature ranging from 40 to 75° C.; and
   the aging (6) occurs at a temperature ranging from 40 to 75° C.

* * * * *